Patented July 31, 1945

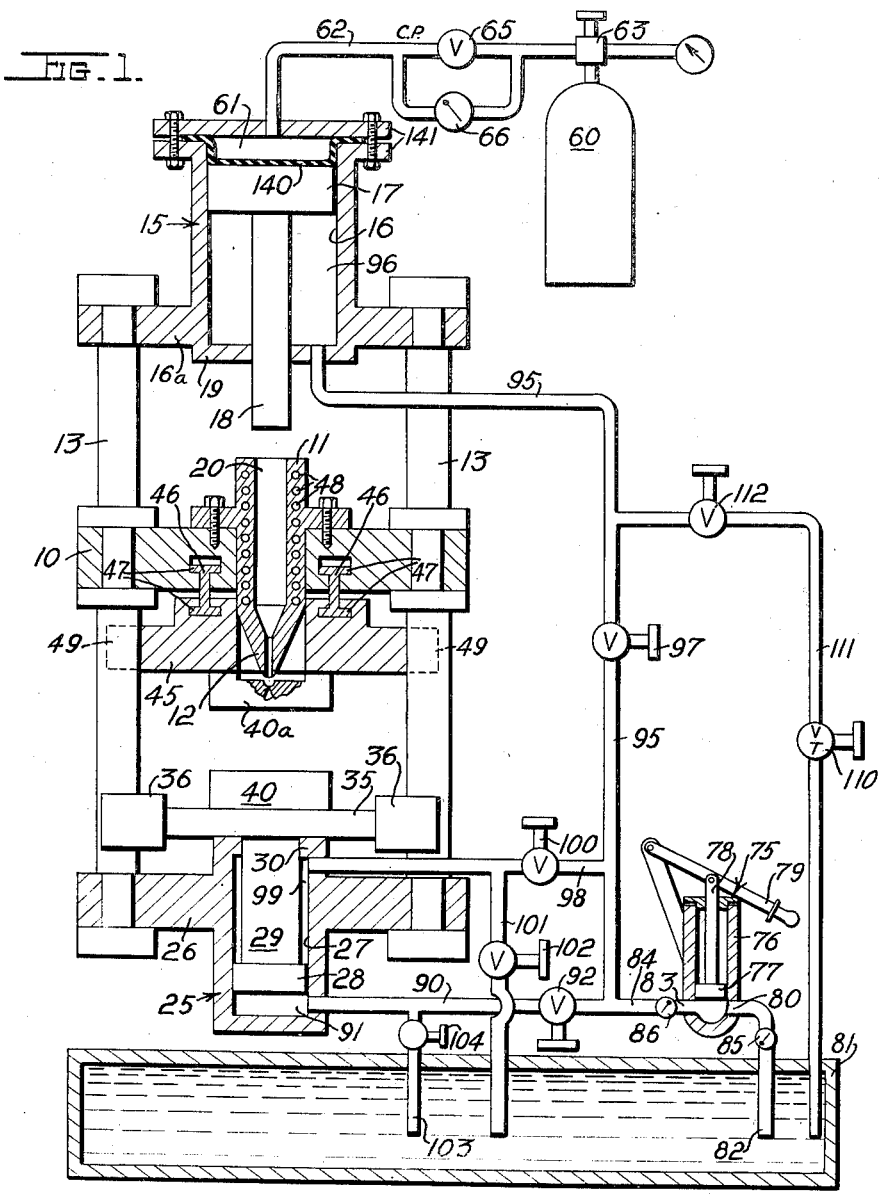

2,380,882

UNITED STATES PATENT OFFICE 2,380,882

INJECTION PRESS

Warren R. Tucker, Dayton, Ohio, assignor to The Hydraulic Development Corp. Inc., Wilmington, Del., a corporation of Delaware Application December 6, 1940, Serial No. 368,895

2 Claims. (Cl. 18—30)

This invention relates to machines having plungers or rams operated by pressure sources for applying forming pressure upon various materials and specifically relates to the improvement of the speed of operation and the means for controlling said speed to obtain improved results in forming presses and extrusion machines.

It is an object of the invention to provide a machine having a fluid operated plunger mechanism wherein the rate of operation of the plunger is controlled by means of the rate of discharge of fluid from the push-back side of the plunger.

It is another object of the invention to provide a machine having a fluid operated plunger mechanism wherein the fluid motor for operating the plunger is advanced by means of a high pressure fluid, and which is controlled in its advancement by controlling the flow of fluid discharged from the opposite side of the motor.

It is another object of the invention to provide a plastic extrusion machine wherein a fluid motor is provided for operating the injection plunger, the fluid motor being advanced by means of a high pressure fluid, and restrained in its advancement by controlling the flow of fluid discharged from the motor.

It is another object of the invention to provide a plastic extrusion machine or a forming press having a fluid motor for operating the injection plunger which is continuously connected to a relatively high pressure source, and which is provided with a hydraulic fluid circuit for causing retraction of the plunger, which circuit re-establishes the pressure in the high pressure circuit upon retraction of the plunger.

Another object of the invention is to provide an extrusion machine or forming press wherein the injection plunger is advanced by means of a high pressure gas source, and which is controlled in its advancement by controlling the discharge of fluid from the push-back cylinder of the fluid motor which controls movement of the injection plunger.

It is another object of the invention to provide a simplified plastic extrusion machine which will accomplish all of the essential ejection operations of a fully automatic machine, but which is under manual control.

It is another object of the invention to provide a plastic extrusion machine having a fluid motor for advancing the injection plunger wherein one side of the fluid motor is continuously connected to a source of relatively high pressure, which pressure is opposed by means of a second fluid system connected to the opposite side of the fluid motor and which re-establishes the pressure on the first fluid system upon each retraction stroke of the plunger.

Another object of the invention is to provide a plastic extrusion machine wherein high speed of injection is obtainable in a manually operated machine.

It is another object of the invention to provide a machine according to the foregoing object wherein the pressure source for operating the injection plunger is higher than would normally be required, the effect of which upon the injection plunger is regulated by controlling the flow of fluid from the fluid motor operating the plunger upon the advancing stroke thereof.

It is another object of the invention to provide a machine having a plunger mechanism wherein the movable elements of the machine are hydraulically actuated, and which hydraulic system maintains and re-establishes a source of dynamic pressure which is connected to the fluid motor for operating the plunger through a forward advancing stroke.

Another object of the invention is to provide a fluid motor for operating the plunger of a forming machine wherein the motor is caused to advance the plunger by means of a high pressure gas, and retract the plunger by means of hydraulic fluid.

It is another object of the invention to provide a fluid motor in accordance with the foregoing object wherein the advancement of the plunger is by means of a high pressure gas and is controlled in its advancement by the rate of flow of liquid from the motor.

Further objects and advantages will become apparent from the following description and from the drawing.

In the drawing:

Figure 1 is a diagrammatic control system for a plastic extrusion machine.

Figure 2 is a diagrammatic showing of a modified system for controlling the rate of flow of a fluid.

One of the major faults of forming or extrusion machines is that the speed of the plunger is dependent upon the capacity of a hydraulic pump which supplies fluid to a hydraulic motor for reciprocating the plunger. The ultimate speed of operation of the plunger or ram on an extrusion machine or forming press is determined by the capacity of the hydraulic pump, and to provide high speeds of operation it is required that the hydraulic pump be of extremely large size. My invention provides an apparatus which eliminates the use of hydraulic pumps for advancing the plunger or ram of a forming machine, and provides a system wherein the pressure for operating the plunger can be any high pressure source of fluid. My invention provides a source of pressure fluid which is greater than any pressure normally to be required for operation of the plunger, the operating effect of which is controlled by controlling the rate of flow of liquid discharged from the push-back chamber of the fluid motor which reciprocates the plunger.

The high speed of operation of the plunger has particular merit when used in combination with a plastic extrusion machine and hence the preferred disclosure is with regard to this type of machine.

In this invention the plastic extrusion machine consists of a frame portion 10 which supports an injection cylinder 11. The injection cylinder 11 extends through the frame member 10 and has a nozzle 12 projecting beyond the frame 10. A plurality of strain rods 13 is carried upon the frame member 10 and is suitably secured thereto.

A hydraulic fluid motor 15 is carried upon a cross head 16a which is mounted upon the strain rods 13 and secured thereto by any suitable means. The fluid motor 15 consists of a cylinder 16 and a piston 17. The piston 17 has a plunger 18 extending through the end wall 19 of the cylinder 16. The plunger 18 is arranged for reciprocation within the bore 20 of the injection cylinder 11.

The strain rods 13 extend through the frame member 19 and are arranged to carry a fluid motor 25. The fluid motor 25 is carried upon a cross head 26 which is suitably secured to the strain rods 13. The motor 25 consists of a cylinder 27 and a piston 28, the piston 28 having a plunger 29 associated therewith which extends through the end wall 30 of the cylinder 27.

The plunger 29 carries a platen 35 which is provided with guide bars 36 in engagement with the strain rods 13. The platen 35 is arranged to carry a die element 40. The platen 35 is arranged to be reciprocated by means of the fluid motor 25 in order to bring the die element 40 into engagement with a die element 40a.

The die element 40a is carried upon a platen 45. The platen 45 is suspended from the frame member 10 by means of the suspension links 46. These suspension links have T-shaped heads 47 which engage suitable openings in the frame member 10 and the platen 45, whereby the platen can be suspended from the frame 10 and be spaced a predetermined distance from the frame member 10.

The nozzle 12 of the injection cylinder 11 is arranged to be spaced from the die element 40a when the platen 45 is in its suspended position, as disclosed in Figure 1. This spacing of the nozzle from the mold breaks the thermal contact therebetween to prevent heat transfer from the injection cylinder to the mold 40a when the die elements 40a and 40 are in the open position. The platen 45 is provided with extending arms 49 which engage the strain rods 13 for guiding the platen 45 when reciprocated by the closing motion of the die elements 40 and 40a.

Any suitable means can be provided for charging the injection cylinder 11 with plastic material which is to be heated therein and ejected from the cylinder. Suitable heating passages 48 surround the cylinder bore 20 of the injection cylinder 11 for heating the plastic material charged into the cylinder. These heating passages may be provided either for the circulation of a hot liquid or gas, or electric resistance elements can be positioned therein for providing the desired heating of the injection cylinder. The various methods of obtaining heating for elevating the temperature of the plastic material within the injection cylinder are well known in the art and further description thereof is not deemed necessary.

The plastic extrusion machine heretofore described is well known in the art and it is understood that the various elements of the machine may take various mechanical forms, the machine as disclosed in this application being for the purpose of disclosing a plastic injection machine which can be operated in accordance with the teachings of my control system.

The control system for operating the plastic injection machine heretofore described consists of a relatively high pressure source which is connected to the fluid motor 15 in a manner that the high pressure source always tends to cause forward advancement of the piston 17 of the fluid motor 15. Thus, this fluid pressure source may consist of a cylinder 60 of a suitable gas maintained under relatively high pressures, which may be in the order of 1500 pounds per square inch. A suitable gas cylinder can be filled with an inert gas, such as nitrogen, and can be retained at the high pressure for an indefinite period. The gas cylinder 60 is connected to the chamber 61 of the fluid motor 15 by means of a conduit 62. When the closure valve 63, provided on the cylinder 60, is opened the gas pressure from the cylinder 60 will enter the chamber 61 of the fluid motor 15 thereby tending to force the piston 17 of the plunger 18 in a forward stroke. This movement is resisted by means which will be hereinafter described.

The gas pressure cylinder 60 represents for the purposes of my invention a source of high pressure which is continuously applied within the advancing chamber 61 for the fluid motor 15. The pressure from the gas cylinder 60 can be applied to the fluid motor 15 at the pressure existing within the gas cylinder 16, or a constant pressure valve 65 can be positioned in the conduit 62 between the cylinder 60 and the chamber 61 of the fluid motor 15.

If the full effect of the gas pressure within the cylinder 60 is directed upon the piston 17 of the fluid motor 15 there will be no reserve supply if the gas pressure should leak from the system. Hence, the interpositioning of a constant pressure valve 65 between the cylinder 60 and the fluid motor 15 permits the use of a higher pressure within the cylinder 60, and reduces the pressure to the value desired to be applied upon the fluid motor 15. This arrangement provides a certain reserve to take care of leakage within the system.

Since the gas pressure within the cylinder 60 is continuously applied within the chamber 61 of the fluid motor 15, it can be seen that some provision is required to permit movement of the gas from the chamber 61 when the piston 17 of the fluid motor 15 is forced through a retraction stroke. A check valve 66 is thus provided in the conduit 62 to permit the constant pressure valve 65 to be by-passed when the gas flow is in the direction toward the cylinder 60, but which will close when the flow of gas is from the cylinder 60.

It is of course within the concept of this invention that other sources of high fluid pressure can be used in place of the gas pressure as heretofore described. As long as the high pressure source continuously applies the effect of its pressure upon the piston 17, the use of high pressure source, regardless of its nature, will come within the concept of this invention.

As heretofore described, the piston 17 of the fluid motor 15 is advanced through the cylinder 16 to cause an injection stroke of the plunger 18 by means of the gas pressure being applied within the chamber 61 of the fluid motor 15. A hydraulic pressure source is provided to oppose the effect of the fluid pressure within the chamber 61 of the motor 15 and to cause a retraction stroke of the piston 17. The hydraulic system also provides means for operating the fluid motor 25 which thereby forces the die element 40 into engagement with the die element 40a to close the mold and to elevate the die element 40a into engagement with the nozzle 12 of the injection cylinder 11.

The hydraulic system consists of a pump 75, which may be either a manually operated pump as disclosed in the drawing in Figure 1, or can be a motor driven pump of the variable delivery constant pressure type. Variable delivery pumps which are controllable as to their maximum pressure delivered are well known articles of commerce, thus further description and disclosure is not deemed necessary. The manually operated hydraulic pump 75, as disclosed in the drawing, consists of a cylinder 76 within which a piston 77 is reciprocated by means of a plunger 78. The plunger 78 is connected to an operating lever 79. The hydraulic pump 75 has an inlet 80 which communicates with a liquid storage tank 81 by means of a conduit 82. A liquid outlet 83 is provided in the pump 75 and communicates with a pressure fluid supply line 84. Suitable check valves 85 and 86 are provided in the inlet and the outlet respectively to control the passage of fluid through the pump 75.

The fluid discharge conduit 84, which communicates with the pump 75, is connected to a conduit 90. The conduit 90 is in communication with a chamber 91 provided within the fluid motor 25 whereby fluid entering the chamber 91 will cause the plunger 29 to advance the die element 40 into closing engagement with the die element 40a. A hand valve 92 is provided in the conduit 90 to control flow of fluid to the chamber 91 of the hydraulic motor 25.

The conduit 84 is also in communication with a conduit 95 which connects with the push-back chamber 96 of the fluid motor 15. A hand operated valve 97 is positioned in the conduit 95 for controlling the flow of fluid under pressure to the push-back chamber 96 of the fluid motor 15.

A conduit 98 interconnects the conduit 95 with the push-back chamber 99 of the fluid motor 25, a hand valve 100 controlling the flow of fluid under pressure through the conduit 98 to the push-back chamber 99. A branch conduit 101 connects into the conduit 98 between the valve 100 and the push-back chamber 99, and communicates with the fluid storage tank 81. A hand valve 102 controls the flow of fluid through the conduit 101. A branch conduit 103 interconnects the conduit 90 with the fluid storage tank 81, and has a valve 104 positioned therein for controlling the return of hydraulic fluid from the chamber 91 of the fluid motor 25 to the fluid storage tank 81.

The hydraulic system heretofore described provides means for providing hydraulic pressure to the fluid motor 25 for clamping the die elements 40 and 40a together, and for advancing the die element 40a into engagement with the nozzle 12 of the injection cylinder 11. The system also provides means for supplying hydraulic fluid to the push-back chamber 96 of the fluid motor 15, whereby the piston 17 and plunger 18 are caused to move through a retraction stroke against the pressure of the gas existing in the chamber 61. The hydraulic circuit thus provides means for overcoming the pressure existing in the chamber 61, and for forcing the fluid in the chamber 61 to return to its reservoir 60, whereby the initial pressure of the fluid in the reservoir 60 is re-established, and will be available for use when the hydraulic fluid within the push-back chamber 96 is permitted to exhaust therefrom under suitable control.

The control over the exhaust fluid from the push-back chamber 96 consists of a choke or fixed orifice valve 110 provided in a by-pass line 111 which interconnects the conduit 95 with the fluid tank 81. The choke valve 110 is constructed in a manner that the size of the orifice therein can be varied to permit alteration of the rate of flow of fluid therethrough. The conduit 111 thus by-passes the hand valve 97 and the hydraulic pump 75 and thus becomes the exhaust line for the push-back chamber 96 of the fluid motor 15. A hand operated shut off valve 112 is positioned in the by-pass conduit 111 for controlling the opening and closing thereof.

When the plastic injection machine is in the position as shown in Figure 1, the shut off valves 112, 104, 102 and 100 have previously been closed to permit hydraulic fluid to be pumped through the conduits 84 and 95 to the push-back chamber 96 of the fluid motor 15 whereby the piston 17 and plunger 18 were moved through a retraction stroke. The valve 97 was then closed whereby hydraulic fluid under pressure was retained in the push-back chamber 96. Subsequent to this operation the valves 100 and 104 were opened while valve 92 was closed to permit hydraulic fluid from the pump to be directed through the branch conduit 98 to the push-back chamber 99 of the fluid motor 25 whereby the die elements 40 and 40a were separated. The fluid in the chamber 91 of the motor 25 was exhausted to the fluid tank 81 through the valve 104 and the conduit 103. As the system now stands the shut off valves 112, 97, 92 and 102 are closed, the valves 100 and 104 being open, and the push-back chambers 96 and 99 of the fluid motors 15 and 25 respectively are filled with hydraulic fluid.

The operation of the injection machine from this point is as follows. The shut off valves 100 and 104 are now closed while the valves 92 and 102 are opened whereby hydraulic fluid is circulated from the pump 75 through the conduit 90 to the chamber 91 in the fluid motor 25, thereby forcing the piston 28 upwardly to close the die elements 40 and 40a, and cause the die element 40a to engage the nozzle 12 of the injection cylinder 11. The hydraulic fluid in the push-back chamber 99 is exhausted through the conduit 98 by way of the conduit 101 and the valve 102 to the fluid storage tank 81. Clamping pressure is thus applied to the die elements 40 and 40a and can be retained through the injection cycle which follows subsequently by means of the pump 75, which if operated manually may require operation during the injection cycle to overcome leakage of the fluid motor 25 past the piston 28, or if a motor driven pump is provided the automatic constant pressure control of the pump itself will maintain the desired clamping pressure.

As heretofore mentioned the push-back chamber 96 of the fluid motor 15 is filled with hydraulic fluid. Also, the gas pressure from the cylinder 60 is existent within the chamber 61 so that a pressure source is constantly available for moving the piston 17 in a forward stroke when hydraulic liquid is discharged from the push-back chamber 96. To cause an injection stroke of the plunger 18 the shut off valve 112 is opened whereby hydraulic fluid from the push-back chamber 96 can traverse the conduits 95 and 111 to the storage tank 81 by way of the choke or fixed orifice valve 110.

The valve 110 provides means for controlling the rate of flow of fluid through the conduits 95 and 111, and thus controls the rate of forward advancement of the piston 17 and the plunger 18. The pressure existing within the chamber 61 of the fluid motor 15 is preferably a substantially constant pressure which is controlled by means of the constant pressure regulating valve 65. If the pressure in the chamber 61 is substantially constant the rate of flow of hydraulic fluid through the valve 110 will be substantially constant when the valve has been adjusted to a predetermined fixed orifice. The speed of operation of the plunger 18 and the piston 17 may thus be controlled by restraining the flow of the hydraulic fluid from the push-back chamber 96, and thus can be varied by varying the orifice within the valve 110.

It is thus seen that this invention provides a system wherein the speed of operation of the injection plunger is controlled by the rate of flow of hydraulic fluid from the push-back chamber of the fluid motor operating the plunger, and that this control is effective regardless of the source of pressure available to the advancing chamber for the motor 15, as long as the pressure within the advancing chamber is sufficient to obtain the desired speed of operation. This pressure within the advancing chamber 61 of the fluid motor 15 may be either a gas pressure, as disclosed in the drawing and as heretofore described, or could be a hydraulic pressure, the criteria of the pressure used being that it shall be constantly applied within the advancing chamber 61 for the fluid motor. If the pressure existing within the advancing chamber 61 of the fluid motor 15 is a substantially constant pressure it can readily be seen that a fixed orifice valve, as disclosed by the valve 110 will control the rate of movement of the plunger 18 at a constant rate.

However, if the pressure within the chamber 61 is a variable pressure then it is required that a control valve capable of establishing a constant discharge liquid flow from the chamber 96 be positioned within the conduit 111. Such a valve is disclosed in Figure 2 which operates in cooperation with the fixed orifice valve 110 to establish a constant liquid flow through the conduit 111. The valve 135 consists of a body 120 within which a piston 121 reciprocates. An inlet chamber 122 is provided around the piston 121 and communicates with the conduit 111. An outlet chamber 123 is provided around the piston 121 and is interconnected with the inlet chamber 122 by means of an orifice 130 in the piston 121, which orifice has a tapered end to control varying quantities of fluid passing therethrough. The outlet chamber 123 communicates with the choke valve 110 by means of a conduit 124. The conduit 124 has a branch conduit 125 which communicates with a chamber 126 provided around the piston 121 and into which the end of the piston 121 extends. The opposite end of the piston 121 slides within a cylinder bore 127 within which there is provided a compression spring 128 for urging the piston 121 into engagement with a stop provided within the chamber 126. The valve 110 communicates with the fluid storage tank 81 by means of the conduit 111a.

The valve just described is arranged to provide a constant pressure in the outlet conduit 124 regardless of the pressure existing in the conduit 111 whereby a predetermined pressure drop is occasioned across the choke or orifice valve 110 to thereby establish a constant flow of fluid through the valve 110 regardless of the pressure existing in the conduit 111. As may be readily seen from the disclosure of the valve 135, as the pressure increases through the chambers 122 and 123, the pressure within the conduit 124 is increased and thus is reflected within the chamber 126 and upon the exposed end of the piston 121, whereby any increase in pressure within the conduit 111 tends to move the piston 121 against the compression of the spring 128 to thereby restrict the flow through the orifice 130 and maintain the pressure in the conduit 124 constant. Since the pressure in the conduit 124 is constant, the pressure drop across the orifice valve 110 will be constant and therefore the flow of fluid will remain constant. Since the flow of fluid has been established at a constant rate the exhaust of the hydraulic fluid from the push-back chamber 96 will be regulated at a constant rate regardless of the pressure existing within the chamber 61 of the fluid motor 15.

It is thus seen that by this system the use of extremely high pressures for causing advancement of the injection plunger 18 is practical since the control of the rate of the advancement of the plunger 18 is definitely established by means of the control valve 110, or the combination of the control valve 110 with the control valve 135.

As heretofore mentioned, the chamber 61 of the fluid motor 15 can be filled with gas pressure from the cylinder 60. As an aid in preventing loss of gas pressure from the cylinder 60 an expansible rubber bag 140 has the edges thereof clamped between the flanges 141. This rubber bag provides a diaphragm or sealed enclosure within which the gas pressure is confined, and which provides a seal between the gas chamber 61 and the hydraulic fluid chamber 96 to prevent leakage of gas between the piston 17 and the cylinder 16.

While the form and embodiment of the disclosure herein presented is a preferred form, yet it is understood that the system herein disclosed can be applied to any machine having a fluid operated plunger thereon and which is desired to be operated at a controlled rate of high speed operation. There are other mechanical arrangements and many other types of machines which fall within the concept of my invention and which are included within the purview of my invention.

Having thus fully described my invention, what I claim as new and desire to secure by Letters Patent is:

1. A plastic injection machine comprising a fixed injection cylinder, an injection plunger reciprocable therein, a fluid motor connected to said plunger for reciprocating the same, a source of high pressure gas having a pressure greater than that required to advance said plunger in said cylinder to eject plastic material from said cylinder, said source of gas pressure being the sole means of advancing said plunger, means connecting said source of gas pressure to one side of said fluid motor for continuously urging the motor to advance said plunger into said cylinder, a source of liquid pressure, means connecting said source of liquid pressure to the opposite side of said motor, said source of liquid pressure being normally idle in the sense that liquid is not supplied therefrom to the fluid motor, means for causing operation of said liquid pressure source to supply fluid to said fluid motor, means for by-passing said source of liquid pressure having flow regulating means therein, flow control means in said by-pass for closing the same to direct liquid from said liquid pressure source to said fluid motor when said liquid source is operated to deliver liquid to said motor, flow control means for stopping the flow of liquid to said fluid motor when said by-pass flow control means is opened to permit flow of liquid through said by-pass as forced from said fluid motor by said gas pressure source, and means disposed between said gas pressure source and said fluid motor for regulating the pressure applied to said motor.

2. A plastic injection machine comprising a fixed injection cylinder, an injection plunger reciprocable therein, a fluid motor connected to said plunger for reciprocating the same, a source of high pressure gas having a pressure greater than that required to advance said plunger in said cylinder to eject plastic material from said cylinder, said source of gas pressure being the sole means of advancing said plunger, means connecting said source of gas pressure to one side of said fluid motor for continuously urging the motor to advance said plunger into said cylinder, a source of liquid pressure, means connecting said source of liquid pressure to the opposite side of said motor, said source of liquid pressure being normally idle in the sense that liquid is not supplied therefrom to the fluid motor, means for causing operation of said liquid pressure source to supply fluid to said fluid motor, means for by-passing said source of liquid pressure having flow regulating means therein, flow control means in said by-pass for closing the same to direct liquid from said liquid pressure source to said fluid motor when said liquid source is operated to deliver liquid to said motor, flow control means for stopping the flow of liquid to said fluid motor when said by-pass flow control means is opened to permit flow of liquid through said by-pass as forced from said fluid motor by said gas pressure source, and means disposed between said gas pressure source and said fluid motor for regulating the pressure applied to said motor, said flow regulating means in said by-pass being constructed and arranged to regulate the flow therethrough at a constant flow rate.

WARREN R. TUCKER.